(12) United States Patent
Iqbal et al.

(10) Patent No.: US 8,548,800 B2
(45) Date of Patent: Oct. 1, 2013

(54) SUBSTITUTION, INSERTION, AND DELETION (SID) DISTANCE AND VOICE IMPRESSIONS DETECTOR (VID) DISTANCE

(75) Inventors: Syed Talat Iqbal, Tamil Nadu (IN); Mareeswari Muthusamy, Tamil Nadu (IN); Abhigyan Mundhra, West Bengal (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 372 days.

(21) Appl. No.: 12/915,409

(22) Filed: Oct. 29, 2010

(65) Prior Publication Data
US 2012/0109636 A1 May 3, 2012

(51) Int. Cl.
*G06F 17/27* (2006.01)

(52) U.S. Cl.
USPC .............................................. 704/9; 704/10

(58) Field of Classification Search
USPC ....................................................... 704/9, 10
See application file for complete search history.

(56) References Cited

U.S. PATENT DOCUMENTS

| | | | |
|---|---|---|---|
| 2008/0208854 A1* | 8/2008 | Badr et al. | 707/6 |
| 2011/0054901 A1* | 3/2011 | Qin et al. | 704/254 |
| 2011/0202876 A1* | 8/2011 | Badger et al. | 715/816 |

* cited by examiner

*Primary Examiner* — Jakieda Jackson

(57) ABSTRACT

A device may receive user input, select two strings to compare based on the user input, obtain a first set of keyboard codes for a first of the two strings, obtain a second set of keyboard codes for a second of the two strings, and determine a distance between the two strings based on the first and the second set of keyboard codes. In addition, the device may send a result associated with determining the distance to another device, store the result in a storage device, or display the result.

20 Claims, 14 Drawing Sheets

$$\begin{bmatrix} \text{DISTANCE} \\ \text{BETWEEN} \\ \text{TWO} \\ \text{STRINGS} \end{bmatrix} = \begin{bmatrix} \text{SID} \\ \text{DISTANCE} \end{bmatrix} * \begin{bmatrix} \text{TAIL} \\ \text{CORRECTION} \\ \text{FACTORS} \end{bmatrix}$$

802 PRIMARY VOWELS

| IMPRESSION | EXAMPLE |
|---|---|
| A | BUT |
| E | BIT |
| U | FOOT |

804 SECONDARY VOWELS

| IMPRESSION | EXAMPLE |
|---|---|
| AE | PLAY |
| EU | YOU |
| UA | POOR |
| AU | COLD |
| EA | FEAR |
| UE | FUEL |

806 STRESSED VOWELS

| IMPRESSION | EXAMPLE |
|---|---|
| A^ | STAR |
| E^ | TREE |
| U^ | — |
| AE^ | FLY |
| AU^ | PLOUGH |

808 COMBINATION VOWELS

| IMPRESSION | EXAMPLE |
|---|---|
| AE^AU | BIOS |
| AU^AE | BOIL |

| WORD1 | CODE 1 | WORD2 | CODE 2 | DISTANCE |
|---|---|---|---|---|
| CALIFORNIA | K4L$F7N8 | KALIPHORNIA | K4L2F7N8 | 0.081250 (92%) |
| CRUISER | KR9S4R | CROOSAR | KR3S!R | 0.116666 (88.3%) |
| BRIDGE | BR2J | BRIJ | BR2J | 0.00 (100%) |

FIG. 12

SUBSTITUTION, INSERTION, AND DELETION (SID) DISTANCE AND VOICE IMPRESSIONS DETECTOR (VID) DISTANCE

BACKGROUND

Many modern applications use different programs and/or object components to search for matching strings. For example, a word processing application may search for a specific word within a text document; a compiler may search for tokens or reserved words in source code during compilation; a practical extraction and reporting language (Perl) interpreter may perform a search within a document to locate strings that match a pattern specified via a regular expression.

BRIEF DESCRIPTION OF THE DRAWINGS

FIG. 8 shows tables of exemplary vowel impressions;

FIG. 12 shows a table illustrating exemplary VID distances between different words;

DETAILED DESCRIPTION

The following detailed description refers to the accompanying drawings. The same reference numbers in different drawings may identify the same or similar elements. As used herein, the term "string" may refer to a sequence of symbols (e.g., letters, special characters (e.g., [, ], @, #, etc.), numerical symbols such as digits (e.g., 0, 1, 2, 3, etc.), Roman numerals, (e.g., I, II, III, IV, etc.), alphabets (e.g., Chinese characters, English alphabet, Hindi alphabet, Greek symbols, etc.), etc.).

Figure 1A:
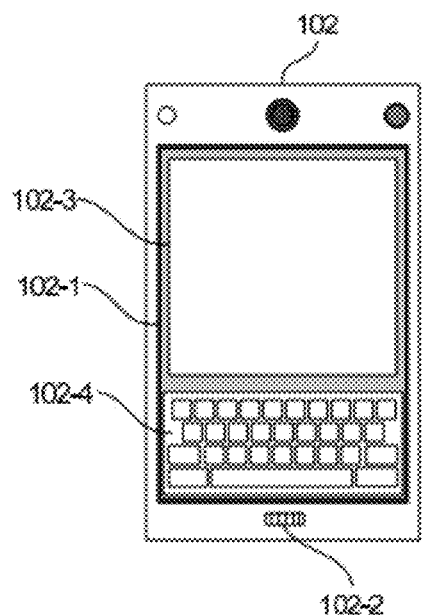
FIGS. 1A and 1B illustrate an overview of exemplary concepts described herein.
Figure 1B:
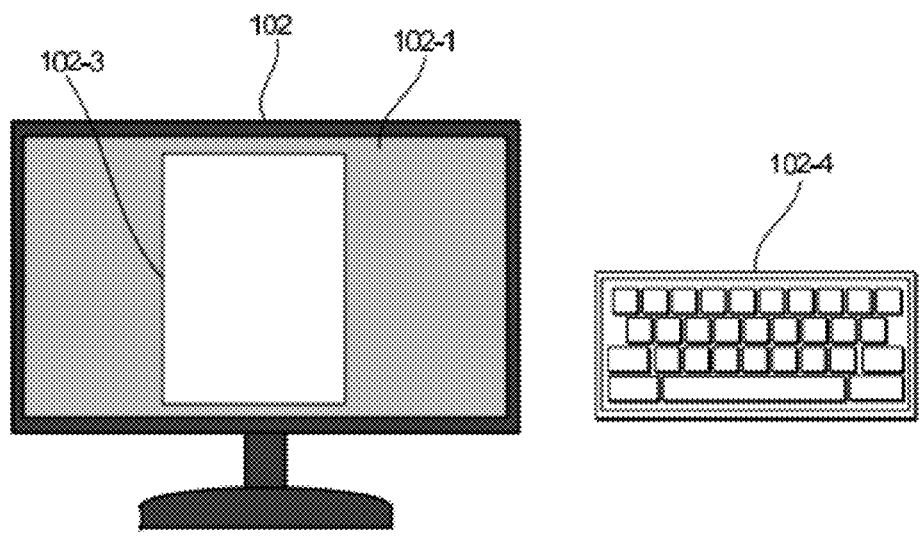

As described below, a device may obtain distances between two strings based on substitution, insertion, and deletion (SID) and type-as-I-like (TAIL) codes and/or voice impressions detector (VID) codes. FIGS. 1A and 1B illustrate the concepts. Device 102 may include, for example, a tablet computer, laptop computer, personal computer, mobile telephone (e.g., cellular telephone), personal digital assistant (PDA), gaming device or console, peripheral (e.g., wireless headphone), digital camera, digital video camera, etc. In some implementations, device 102 may include a server device, super computer, workstation, specialized computational devices (e.g., LISP-machine), etc.

In FIG. 1A, device 102 is illustrated as a smart phone. As shown, device 102 may include a display 102-1 and microphone 102-2. Although not shown for simplicity, device 102 may include other hardware components, such as speakers, cameras, sensors (e.g., ultrasound sensor, infrared sensor, etc), flash, etc.

Device 102 may include an application that processes strings (e.g., an email application, text messaging (e.g., Short Message Service (SMS) messaging) application, instant messaging application, word processing application, speech-to-text application, text-to-speech application, text editor, document editor/viewer (e.g., browser), optical character-recognition application, etc.).

The application may receive input via a soft keyboard 102-4 on a touch-screen that overlays display 102-1, via microphone 102-2, or via another type of input component (e.g., a cellular phone keypad). In some implementations, the input may be received over a network, from a file, etc. Device 102 may display strings being processed on a window 102-3 that is associated with the application and that is shown via display 102-1. In some implementations, device 102 may store the strings (e.g., in a file or as part of database records) or send the strings to another device.

FIG. 1B shows another exemplary embodiment of device 102 according to a different implementation. As shown in FIG. 1B, device 102 may include a computer with a display 102-1 and keyboard 102-4. Although not shown for simplicity, device 102 may also include other hardware components, such as a microprocessor, microphone, network interface, external drive, camera, speakers, game console (e.g., a joystick, steering wheel, etc.) and software components (e.g., operating system, applications, etc.). Like the device 102 in FIG. 1A, device 102 in FIG. 1B may include an application that processes strings.

Depending on the implementation, the applications in device 102 in FIGS. 1A and 1B may process strings for different purposes. For example, in one implementation, the application may make spelling suggestions as a user types a word. The application may suggest a string that most closely matches the typed word. In another implementation, the application may spell check a document, comparing each word in the document to words in a dictionary. The application may be a word processing program, speech-to-text transcription program, instant messaging program, text messaging program, etc.

Figure 2:
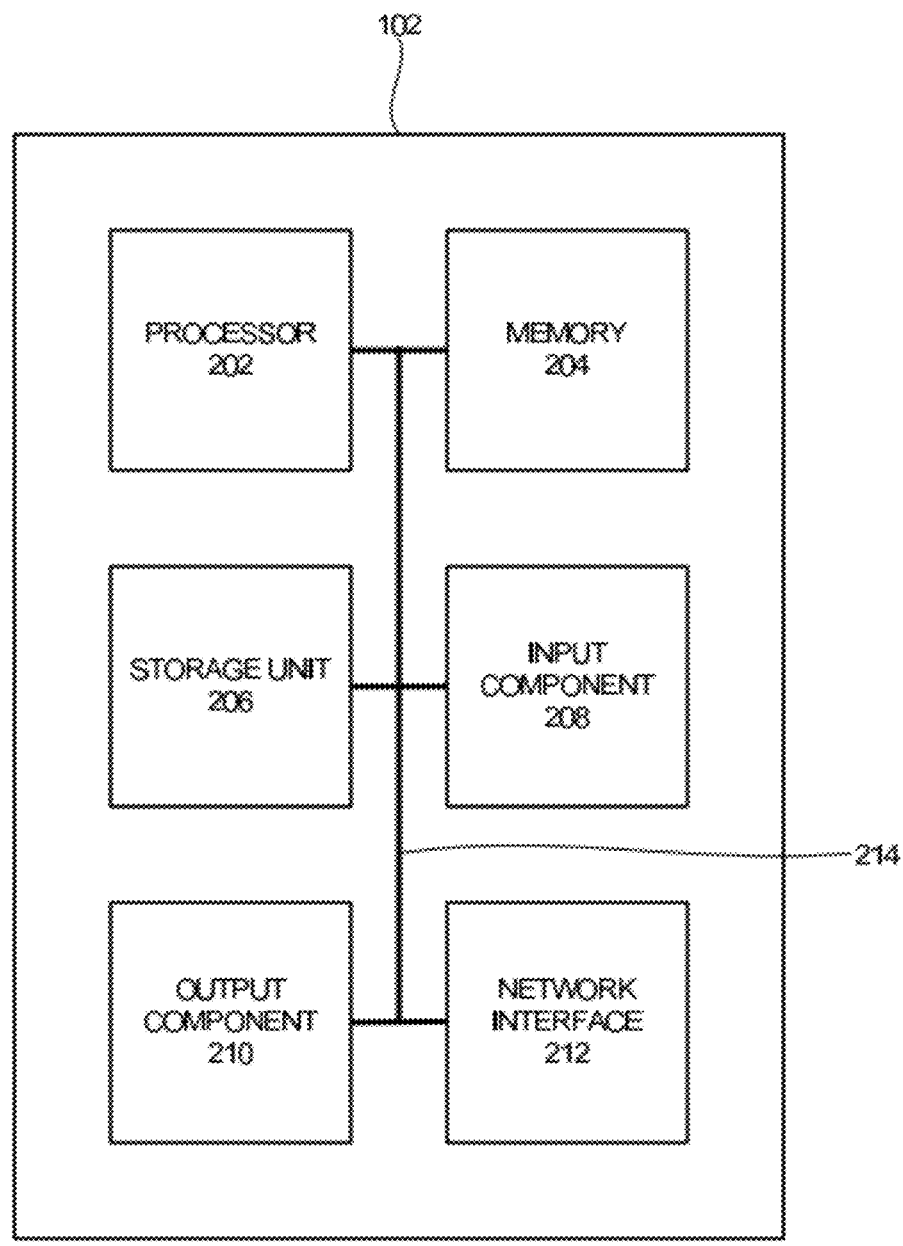
FIG. 2 is a block diagram of exemplary components of the device of FIGS. 1A and 1B.

FIG. 2 is a block diagram of an exemplary implementation of device 102. As shown, device 102 may include a processor 202, memory 204, storage unit 206, input component 208, output component 210, network interface 212, and communication path 214. In different implementations, device 102 may include additional, fewer, different, or a different arrangement of components than the ones illustrated in FIG. 2. For example, device 102 may include network cards for connecting to external communication lines.

Processor 202 may include a processor, a microprocessor, an Application Specific Integrated Circuit (ASIC), a Field Programmable Gate Array (FPGA), and/or other processing logic (e.g., embedded devices) capable of executing instructions, performing computations, running applications or an operating system, controlling device 102, managing device resources, etc.

Memory 204 may include static memory, such as read only memory (ROM), and/or dynamic memory, such as different types of random access memory (RAM), or onboard cache, for storing data and machine-readable instructions (e.g., programs, scripts, etc.). Storage unit 206 may include a floppy disk, CD ROM, CD read/write (R/W) disc, and/or flash memory, as well as other types of storage devices (e.g., hard disk drive) for storing data and/or machine-readable instructions (e.g., a program, script, etc.). Memory 204 and storage unit 206 may be part of a "computer-readable storage medium/device" that stores temporary or persistent machine-readable instructions for execution by processor 202.

Input component 208 and output component 210 may provide input and output from/to a user to/from device 102. Input/output components 208 and 210 may include a display screen, a keyboard, mouse, speaker, microphone, camera, DVD reader, subscriber identity module (SIM), game console, barcode reader, external storage device, printer, and/or other types of components for converting physical events or phenomena to and/or from signals that pertain to device 102.

Network interface 212 may include a transceiver (e.g., a transmitter or receiver) for device 102 to communicate with other devices and/or systems. For example, via network interface 212, device 102 may communicate over a network, such as the Internet, an intranet, a terrestrial wireless network (e.g., a WLAN, WiFi, WiMax, etc.), a satellite-based network, optical network, etc. Network interface 212 may include a modem, an Ethernet interface to a LAN, and/or an interface for connecting device 102 to other devices (e.g., a Bluetooth interface). Communication path 214 may provide an interface through which components of device 102 can communicate with one another.

Figure 3:
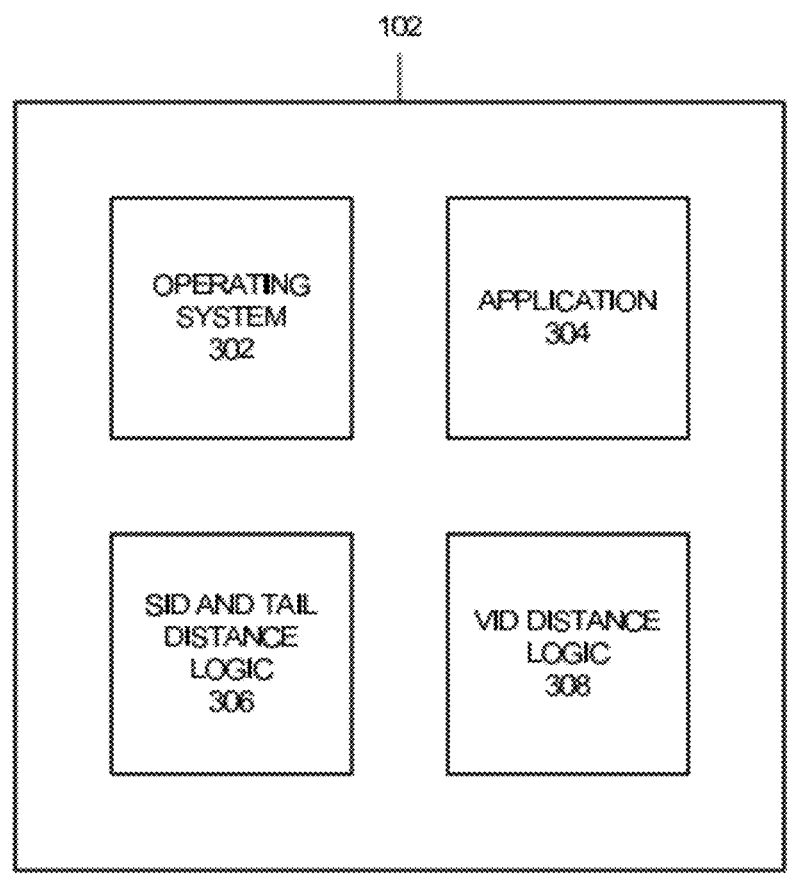
FIG. 3 is a block diagram of exemplary functional components of the device of FIGS. 1A and 1B.

FIG. 3 is a block diagram of exemplary functional components of device 102. As shown, device 102 may include an operating system 302, application 304, SID and TAIL distance logic 306, and VID distance logic 308. Depending on the implementation, device 102 may include additional, fewer, different, or a different arrangement of components than those illustrated in FIG. 3. For example, in one implementation, a component may be combined with other components (e.g., SID and TAIL distance logic 306 and VID distance logic 308 may be integrated into application 304). Although device 102 may include other functional components (e.g., device drivers, thread management logic, a file manager (e.g., logical volume manager), transport control protocol (TCP)/IP stacks, a database of words (e.g., dictionary), web server, etc.), for simplicity, they are not illustrated in FIG. 3.

Operating system 302 may manage resources of device 102. For example, operating system 302 may allocate memory for different processes, ration processor time to different processes and/or threads, assist in distribution of events or enable inter-process communications, initiate or terminate applications/processes, de-allocate memories, etc.

Application 304 may include a program or component that compares strings. Depending on the implementation, application 304 may include a spell checker, word processing application, text or instant messaging application that provides for spell checking or word suggestions, speech-to-text processing application, browser, text messaging application, etc. In comparing the strings, application 304 may invoke or use SID and TAIL distance logic 306 and/or VID distance logic 308 to measure distances between the strings. In one implementation, the more similar two strings are, the smaller the distance between the two strings. As described below, a distance between two strings may be measured in different ways.

SID and TAIL distance logic 306 may determine a distance between two strings based on a SID distance and on TAIL correction factors. The SID distance may be based on a number of edits that may be made on one of the two strings to render the two strings the same. The TAIL correction factors may be determined based on codes that are pre-assigned to the alphabets of the strings. The codes may have been assigned to the alphabets based on the spatial arrangement of keys, on a keyboard (e.g., QWERTY keyboard), that correspond to the alphabets.

VID distance logic 308 may compare two strings based on phonetic codes. Because VID distance logic 308 determines a distance between two strings based on similarity of sounds, VID distance logic 308 may be capable of matching two strings even when most of the symbols of the strings mismatch. For example, assume that a user has input, via application 304, the word "Teksas." In this case, VID distance logic 308 may determine that the word "Texas" is close to "Teksas," and suggest "Texas" as a correctly-spelled alternative to "Teksas."

This is in contrast to some applications that may be unable to determine a distance between two strings due to phonetic peculiarities that are associated with English. For example, a letter may represent different sounds in different words. More specifically, for example, the word "minute" which is a unit of time may sound different from "minute" which means small. In another example, two different words in English may sound identical (e.g., the word "advise" v. "advice"). Furthermore, the English alphabet includes 5 vowels but 6 vowel sounding symbols (e.g., a, e, i, o, u, and y). The symbols, individually, may be unable to characterize ~25 vowel sounds in English.

VID distance logic 308 may overcome a number of such peculiarities and accurately measure a distance between two strings. In some embodiments, VID distance logic 308 may rely on 20% of phonetic rules to successfully generate phonetic codes for about 80% of words. This is in line with Pareto 80-20 principle, which attributes 80% of events of one type (e.g., crop yield, factory output, etc.) to result from 20% of event generators (e.g., farmers, manufacturers, producers, etc.).

VID distance logic 308 may generate, for each of the two strings, a phonetic word that includes two sets of phonetic codes, herein referred to as consonant impressions and vowel impressions. VID distance logic 308 may then determine a sum of consonant and vowel distances between the phonetic words. VID distance logic 308 may normalize the sum to obtain a VID distance.

Figures 4A, 4B:
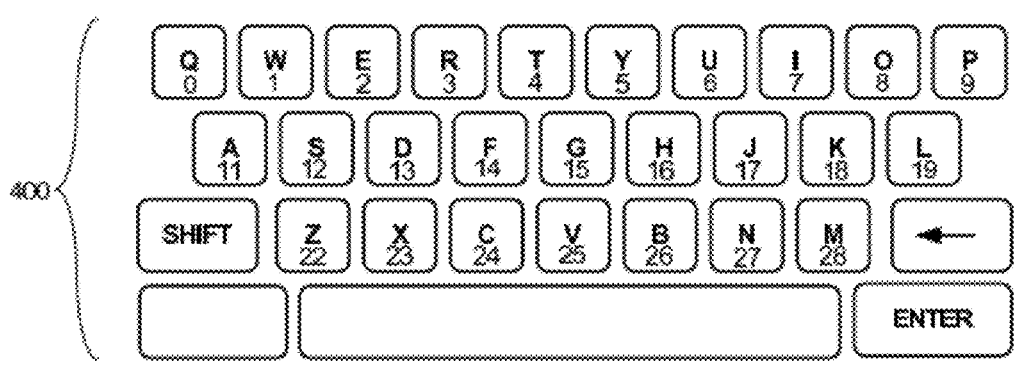
FIG. 4A illustrates operation of the substitution, insertion, and deletion (SID) and type-as-I-like (TAIL) distance logic of FIG. 3.
FIG. 4B illustrates exemplary codes that are assigned to symbols of an alphabet according to one implementation.

FIG. 4A illustrates operation of SID and TAIL distance logic 306. As stated above, SID and TAIL distance logic 306 may determine a distance between two strings. As shown in FIG. 4A, SID and TAIL distance logic 306 may determine the distance based on the following expression:

Distance between two strings=SID distance−TAIL correction factors. (1)

SID and TAIL distance logic 306 may first determine the SID distance in expression (1) by counting the number of substitution, insertion, and/or deletion (SID) and transposition operations (e.g., a minimum number of edits) required to convert a first of the two strings into the second of the two strings. For example, consider two strings "GATING" and "GETTING." "GATING" may be converted into "GETTING" by inserting 'T' between 'T' and 'I' in "GATING" and substituting 'E' in place of 'A.' Hence, the number of SID and transposition operations needed to convert "GATING" into "GETTING" is two, and consequently SID distance is two.

In another example, consider "TAHT" and "THAT." "TAHT" may be converted into "THAT" by exchanging 'A' and 'H' in "TAHT." Therefore, in this example, the number of SID and transposition operations to convert "TAHT" to "THAT" is one, and the SID distance is also 1. This is in contrast to the total number of insertions and deletions, which is two, to convert "TAHT" into "THAT." In a typical typewritten document, inadvertent transposition of letters 'a' and 'h' may occur most frequently (e.g., 95% of typographical errors).

In addition, SID and TAIL distance logic 306 may determine TAIL correction factors in expression (1) by using codes that are assigned to the symbols of the alphabets of the strings. FIG. 4B illustrates exemplary codes that are assigned to symbols of the English alphabet. In FIG. 4B, each of the symbols is assigned a code based on the relative position/location of the symbol on keyboard 400. For example, the symbols Q, W, E, R, T, Y, U, I, O, P, A, S, D, F, G, H, J, K, L, Z, X, C, V, B, N, and M of keyboard 400 are assigned 0, 1, 2, 3, 4, 5, 6, 7, 8, 9, 11, 12, 13, 14, 15, 16, 17, 18, 19, 22, 23, 24, 25, 26, 27, and 28, respectively. One character that is not associated with a symbol is a null character/symbol (e.g., used to represent the end of a string stored in memory 304), which may be assigned an arbitrary number, such as 99.

Although keyboard 400 is illustrated as a QWERTY keyboard, in a different implementation, keyboard 400 may include a different type of keyboard, with different symbols, etc. in a different arrangement. In addition, different codes (e.g., different numbers) may be assigned to the keys.

To obtain TAIL correction factors using the codes, SID and TAIL distance logic 306 may determine differences in two sets of keyboard codes for symbols of the two strings, and look up each of the differences in a translation table. For example, assume that the two strings are "BELOW" and "BLOW." In contrast to the word "BLOW," letter E in "BELOW" stands between letter B and letter L. Accordingly, the code differences are given by: D1=ABS (code for letter B−code for letter E) and D2=ABS (code for letter E−code for letter L). From keyboard 400, D1=ABS (26−2)=24 and D2=ABS (2−19)=17.

Figure 5:
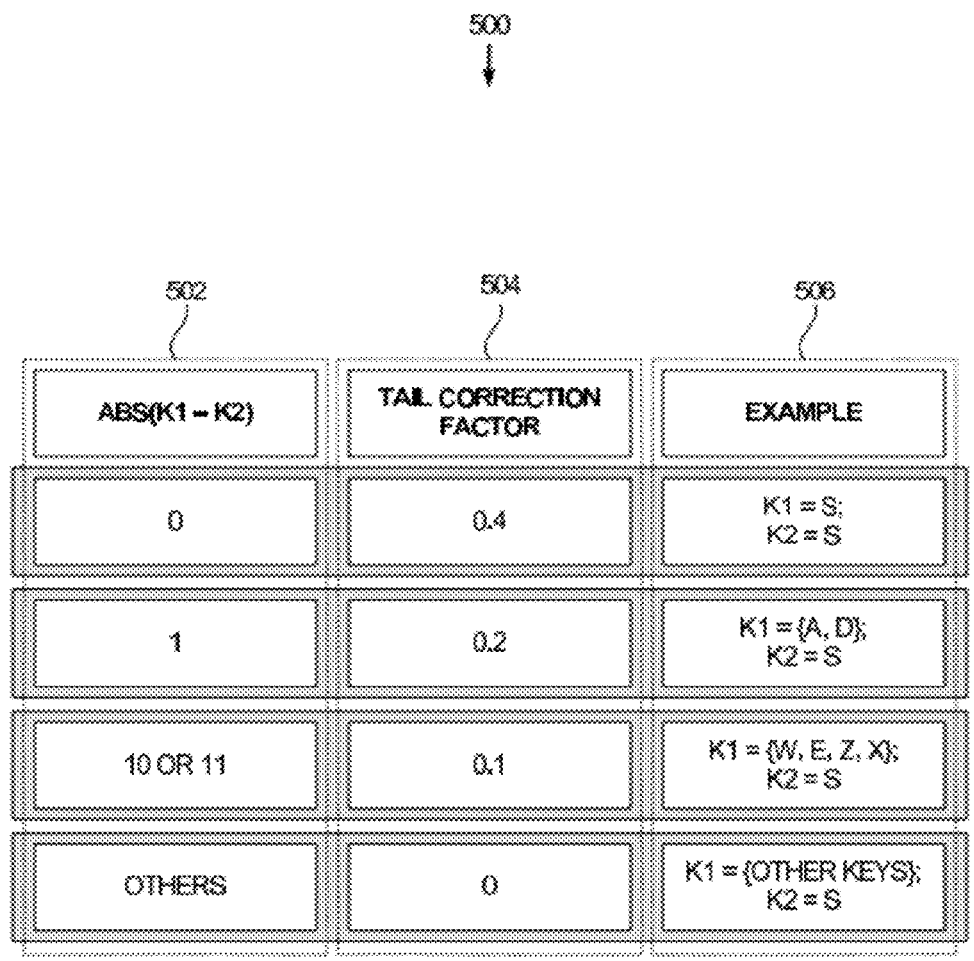
FIG. 5 shows an exemplary translation table.

To complete obtaining the TAIL correction factors, SID and TAIL distance logic 306 may use each of the differences (e.g., 24 and 17 in the preceding example) to look up a TAIL correction factor in a translation table. FIG. 5 shows an exemplary translation table 500. As shown, for each of value/range of differences in column 502 (e.g., 0, 1, 10 or 11, and others), a column 504 includes a corresponding TAIL correction factor (e.g., 0.4, 0.2, 0.1, and 0). For example, assume that two strings differ by the letter S and that K1=S and K2=2, as shown in column 506. The code difference, determined as ABS(code for K1−code for K2)=ABS(code for S−code for S)=ABS(12−12), is zero, and according to translation table 500, the TAIL correction factor is 0.4. Column 506 illustrates examples of two symbols whose differences in code belong to one of the ranges listed in column 502.

In the above, the codes in FIG. 4B and the TAIL correction factors in translation table 500 provide for adjusting for frequently occurring typographical errors on keyboard 400. For example, while typing on keyboard 400, a user is most likely to mistype keys that are proximate to the keys of correct symbols. For example, the user is more likely to mistype 'a' in place of 's' than mistype 'w' in place of 's.' 'A' and 's' are on the same row of keyboard 400, and 'w' and 's' are on different rows. Accordingly, two strings that differ by 'a' and 's' at the same position may be deemed closer to one another than two otherwise identical strings that differ by 's' and 'w' at the same position. To ensure that two strings which differ in symbols of proximate keys on keyboard 400 are closer distance-wise than two strings that differ in symbols of keys that are further apart spatially, the correction factors in table 500 may be selected such that the factors decrease exponentially as a function of increasing distance between the keys of corresponding symbols.

In another implementation, the correction factors may vary in accordance with a different relationship between the symbols. In addition, the correction factors may be designed to cover a different keyboard layout, by changing the layout of keyboard 400 and, accordingly, changing the correction factors in table 500.

The following examples illustrate SID and TAIL distance logic 306 determining a distance between two strings. For example, consider "America" and "Amreica." Transposing or exchanging 'e' and 'r' in "America" produces "Amreica," and therefore, SID and TAIL distance logic 306 may determine, in expression (1), that the SID distance is one.

To obtain the TAIL correction factors in expression (1), SID and TAIL distance logic 306 may determine a first distance, D1, between 'r' at the third symbol position in "Amreica" and 'e' at the third symbol position of "America." In addition, SID and TAIL distance logic 306 may determine a second distance, D2, between 'e' at the fourth symbol position of "Amreica" and 'r' at the fourth symbol position of "America." Consulting FIG. 4B, SID and TAIL distance logic 306 may determine D1=D2=ABS(code for 'r'−code for 'e') =ABS(3−2)=1. SID and TAIL distance logic 306 may then obtain the TAIL correction factors of 0.2 and 0.2 by performing lookups of D1 and D2 in table 500. Based on the SID distance determined above and the correction factors, SID and TAIL distance logic 306 may evaluate expression (1), to obtain distance D=1−0.2−0.2=0.6.

In another example, consider strings "boo" and "bool." The SID distance between "boo" into "bool" is one (e.g., an insertion of 'l' in the first string). The second string is different from the first due to the presence of 'l' between 'o' and a null character (e.g., a symbol signifying the end of string "boo"). Hence, D1=ABS(code for 'l'−code for 'o')=ABS(19−8)=11 and D2=ABS(code for 'l'−code for null)=ABS(19−99)=80. Table 500 indicates that the TAIL correction factors for D1 and D2 are 0.1 and 0. Accordingly, distance D=1−0.1−0=0.9.

In yet another example, consider strings "bladder" and "blader." The SID distance between "bladder" and "blader" is 1 (e.g., a deletion of 'd' between 'd' and 'e'). In addition, D1=ABS(code for 'd'−code for 'd')=0 and D2=ABS(code for 'd'−code for 'e')=ABS(13−2)=11. Looking up D1 and D2 in table 500 yields 0.4 and 0.1, respectively. Accordingly, D=1−0.4−0.1=0.5.

In some implementations, SID and TAIL distance logic 306 may determine a distance between two strings by looking up, in an error matrix, matrix elements each of whose rows and columns correspond to mismatching symbols of the two strings, rather than by evaluating expression (1). Each element of the error matrix corresponds to a value of one minus a TAIL correction factor for two mismatching symbols from the two strings. The two mismatching symbols correspond to the row and column of the matrix element.

For example, assume that an error matrix is a 26×26 matrix. Further, assume that the two strings are "bat" and "bit." In this example, the mismatching symbols of the first and second string are 'a' and 'i,' respectively, and SID and TAIL distance logic 306 may locate the matrix element whose column and row are designated by 'a' and 'i.' The located matrix element has the value of 1−the TAIL correction factor=1−0=1. For two strings with more than one pair of mismatching symbols, SID and TAIL distance logic 306 may determine the distance by locating and summing matrix elements that correspond to each pair of the mismatching symbols in the two strings.

By consulting the error matrix rather than evaluating expression (1), SID and TAIL distance logic 306 may save processing cycles needed for performing multiple table lookups. In addition, because the error matrix may be symmetric and sparse, implementation of the error matrix may be inexpensive in terms of memory.

In some implementations, when SID and TAIL distance logic306 determines a distance associated with an operation (e.g., one of substitution, insertion, deletion (SID) and transposition)), SID and TAIL distance logic 306 may take into consideration letters that are near the modified letters. For example, assume that SID and TAIL distance logic 306 is determining the distance between "SITTIN" and "SITTING." The operation to convert "SITTIN" to "SITTING" is the insertion of the letter G between "N" and null character in "SITTIN." However, because of the presence of the null character to the right of "G" (after the insertion) the contribution of the insertion operation to the overall difference may be given less weight than one. That is, SID and TAIL distance logic 306 may provide for giving less weight to errors that are identifiable.

In some implementation, application 304 may generate an exception upon determining that two strings are distant. Furthermore, upon generating the exception, application 304 may eliminate or correct not only errors (e.g., convert a user-typed string into a string in a dictionary) that are associated with mistyped symbols due to proximate keys, but also other errors (e.g., a misspelling caused by the user's incorrect knowledge).

Figure 6:
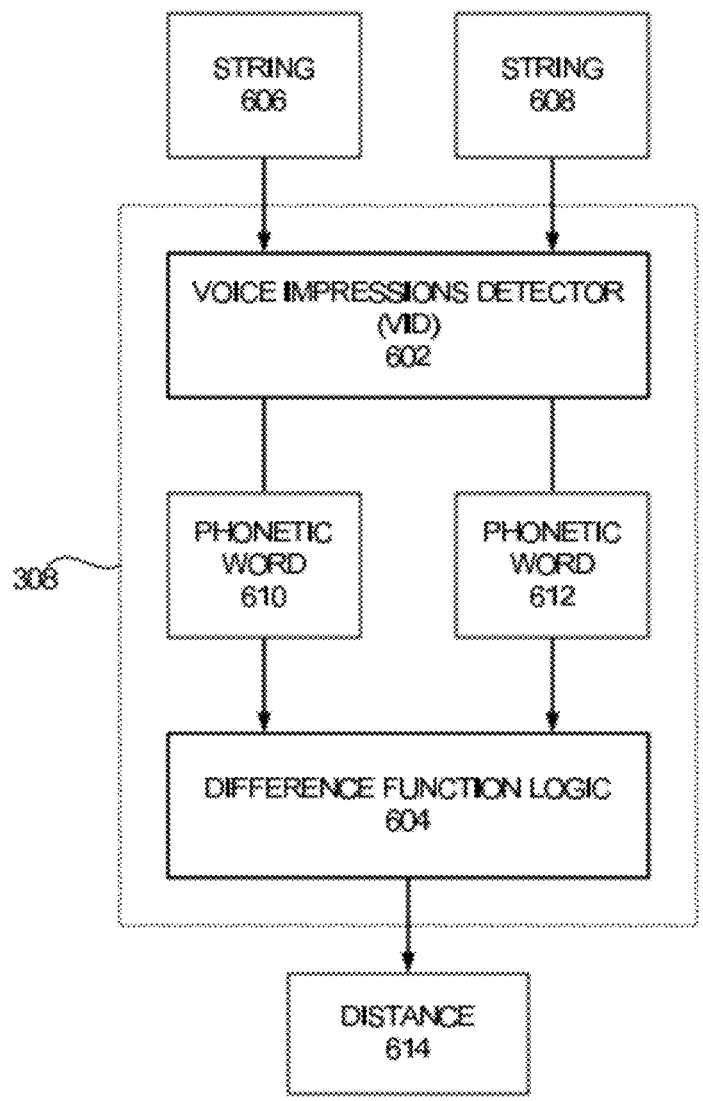
FIG. 6 is a block diagram of exemplary functional components of the voice-impressions detector (VID) distance logic of FIG. 3.

FIG. 6 is a block diagram of exemplary functional components of VID distance logic 308. As described above, application 304 may invoke VID distance logic 308 for determining a distance between two strings based on phonetic codes. As shown in FIG. 6, VID distance logic 308 may include voice impression detector (VID) 602 and a difference function logic 604. Depending on the implementation, VID distance logic 308 may include additional, fewer, different, or a different arrangement of components than those illustrated in FIG. 6.

VID 602 may receive input strings 606 and 608, and may generate phonetic words 610 and 612, respectively. Each of phonetic words 610 and 612 may include consonant codes ("consonant impressions") and vowel codes ("vowel impressions").

In generating phonetic word 610, VID 602 may scan, from left to right, each symbol of string 606. During the scan, VID 602 may flag two symbols that precede and two symbols that follow the current symbol being processed, and, based on a consonant classification system and a vowel classification system (which are described below), may classify and output one or more symbols as either a consonant impression (consonant code) or a vowel impression (vowel code).

If the symbols are classified as a consonant impression/code according to the consonant classification system, VID 602 may output the consonant impression or the code. If the symbols are classified as a vowel impression/code according to the vowel classification system, VID 602 may generate, as an output, a code that is associated with the vowel impression. Accordingly, from the sequence of symbols in string 606, VID may output a sequence of consonant impressions/codes and/or the vowel impressions/codes, which are then strung together as phonetic word 610. VID 602 may process string 608 similarly, to output phonetic word 612.

Difference function logic 604 may determine a VID distance 614 between phonetic words 610 and 612. In one implementation, VID distance 614 may have been normalized such that VID distance 614 is between 0 and 1. In such a case, the VID distance of zero may represent a perfect match. In other implementations, the VID distance 614 may be normalized differently (e.g., normalized to be between X and Y, where X and Y are predetermined numbers).

Figure 7:
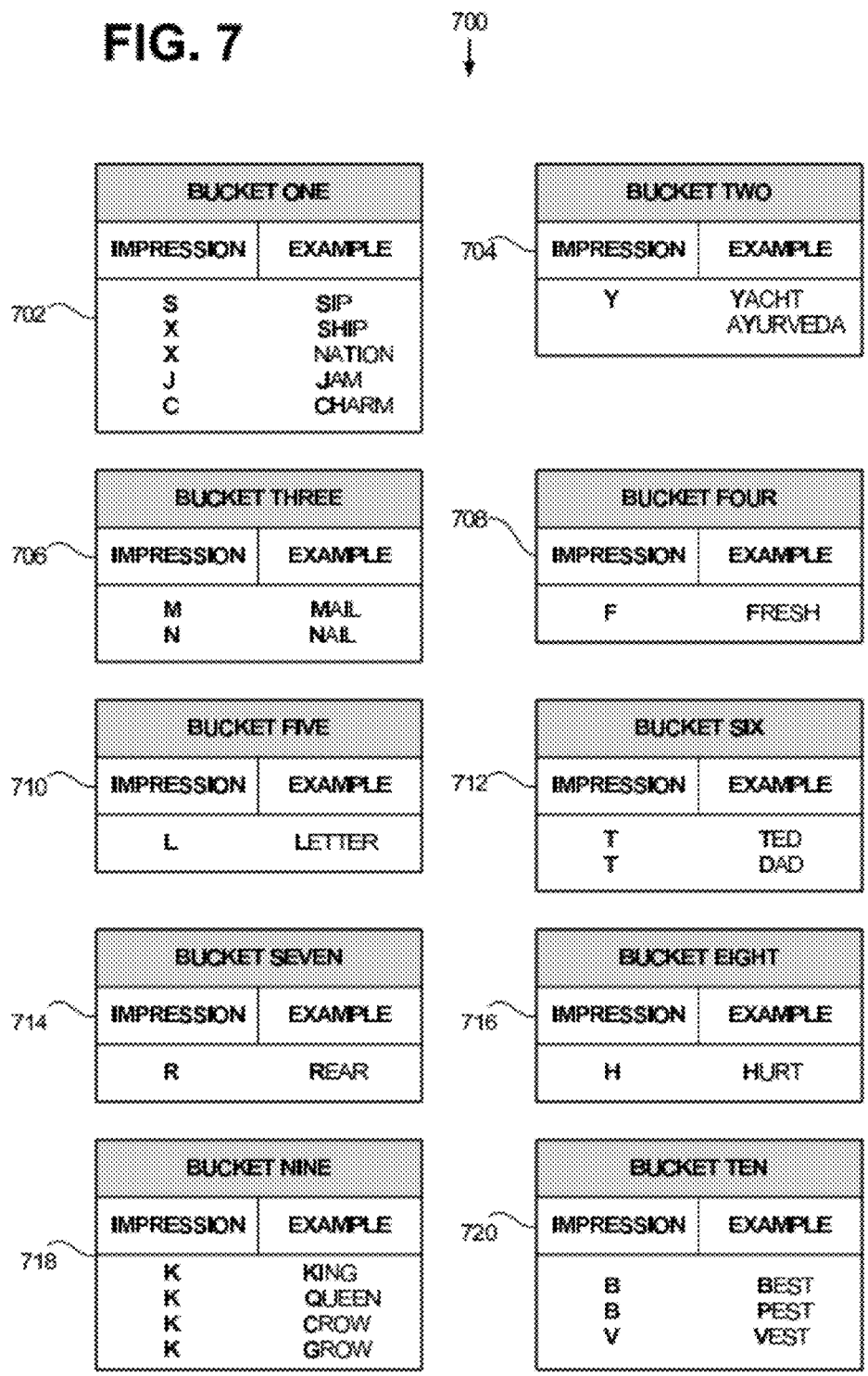
FIG. 7 shows buckets of exemplary consonant impressions.

FIG. 7 shows exemplary system 700 for classifying symbols as consonant impressions. VID 602 may output one of the consonant impressions to which VID 602 classifies symbols of string 606/608. As shown, system 700 may include 15 consonant impressions that are grouped into 10 buckets. Each bucket may include consonant impressions that sound similar. In other implementations, symbols may be classified into one of additional, fewer, or different consonant impressions than those illustrated in FIG. 7. In addition, a consonant impression may be grouped into one of fewer, additional, or different buckets than those illustrated in FIG. 7.

Bucket one 702 may includes the following consonant impressions: "s" impression as in "sip"; "x" impression as in "ship"; "x" impression as in "nation"; "j" impression as in "jam"; and "c" impression as in "champ." Bucket two 704 may include: "y" impression as in "yacht" or "Ayurveda." Bucket three 706 may include "m" and "n" impressions in "mail" and "nail," respectively. Bucket four 708 may include "f" impression in "fresh." Bucket five 710 may include "l" impression in "letter."

Bucket six 712 may include "t" impression as in "ted" and "dad," respectively. Because "t" and "d" are similar, they are classified as a single consonant impression. Bucket seven 714 may include "r" impression as in "rear." Bucket eight 716 may include "h" impression as in "hurt." Bucket nine 718 may include "k" impressions as in "king," "queen," "crow," and "grow." "K" and "q" are sufficiently similar to warrant their classification into the single impression "k." Bucket ten 720 may include "b" and "v" impressions as in "best," "pest," and "vest."

FIG. 8 shows exemplary system 800 for classifying symbols as vowel impressions. VID 602 may output a code that is associated with the vowel impression to which the symbols are classified. Depending on the context, the output code may also be referred to as vowel impression. As shown, system 800 may include 13 different vowel impressions that are grouped into 4 tables. The tables may include primary vowels 802, secondary vowels 804, stressed vowels 806, and combination vowels 808. Depending on the implementation, vowels may be classified into one of fewer, additional, or different tables than those illustrated in FIG. 8.

Primary vowels 802 may include "a," "e", and "u" impressions as in "but," "bit," and "foot," respectively. Secondary vowels 804 may include "ae," "eu," "ua," "au," "ea," and "ue" impressions as in "play," "you," "poor," "cold," "fear," and "fuel," respectively. Stressed vowels 806 may include "aˆ," "eˆ," "aeˆ," and "auˆ" impressions as in "star," "tree," "fly," and "plough," respectively. Combination vowels 808 may include vowel impressions that are combinations of those in secondary vowels 804. Combination vowels 808 may include "aeˆau" and "auˆae" impressions as in "bios" and "boil," respectively.

Figure 9:
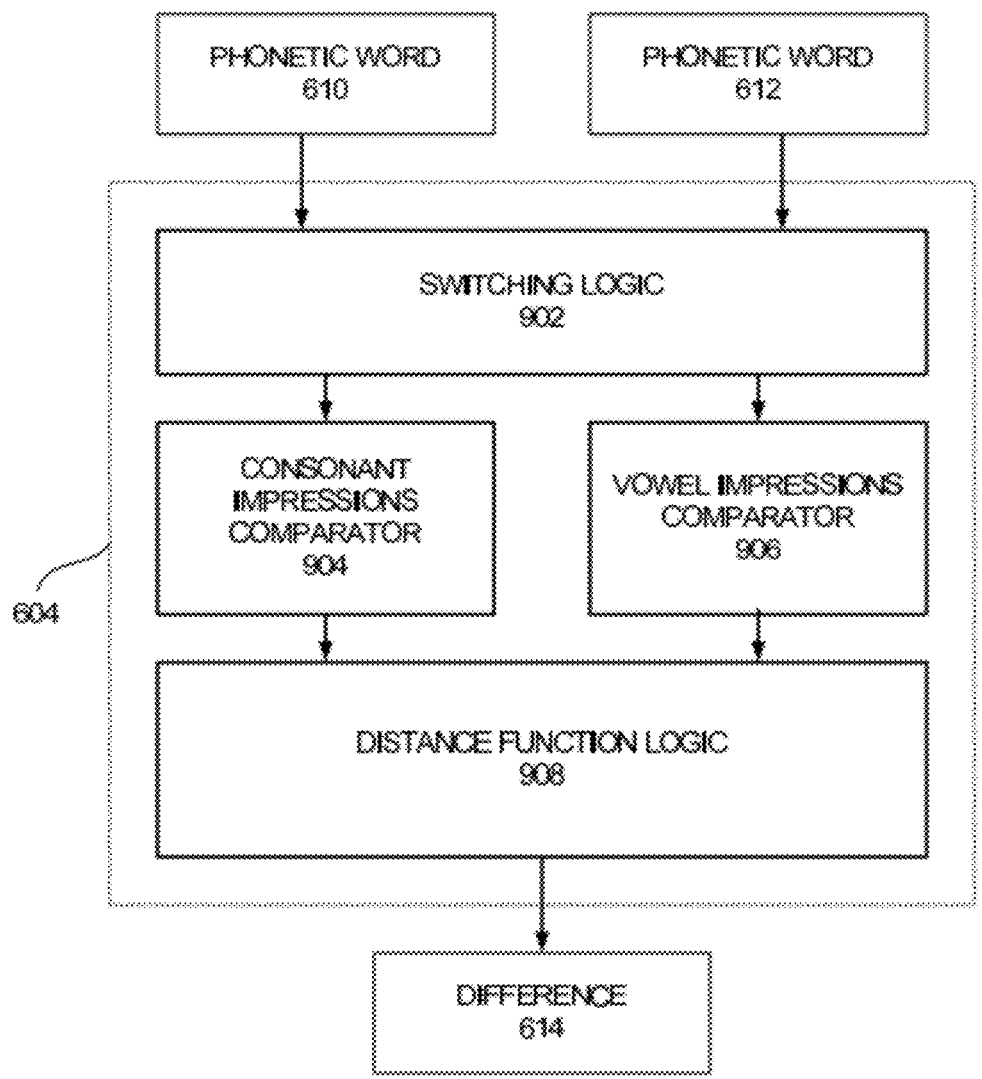
FIG. 9 is a block diagram of exemplary functional components of the difference function logic of FIG. 6.

FIG. 9 is a block diagram of exemplary functional components of difference function logic 604. As shown, difference function logic 604 may include switching logic 902, a consonant impressions comparator 904, a vowel impressions comparator 906, and distance function logic 908. Depending on the implementation, difference function logic 604 may include additional or different components than those illustrated in FIG. 9.

Switching logic 902 may determine, for each phonetic code in word 610 and a corresponding code in word 612, whether the codes should be input to consonant impressions comparator 904 or vowel impressions comparator 906. Switching logic 902 may forward the pair of codes to the identified impressions comparator 904/906.

Consonant impressions comparator 904 may receive two consonant codes/impressions as input and may output a distance between the input impressions. The distance may depend on whether the impressions are the same and whether the impressions belong to the same bucket. For example, when an impression in word 610 and the corresponding impression in word 612 are the same, consonant impressions comparator 904 may output the value 0 (or another value indicating the sameness of the impressions). For example, assume that word 610 is FL9NS@. and word 612 is FL6NTS@. Given the impression F from word 610 and word 612, consonant impressions comparator 904 may output the value 0.

When impressions in words 610 and 612 are different but still belong to the same bucket, consonant impressions comparator 904 may output the value ½ (or another value indicating the impressions may be considered somewhat similar). For example, assume that an impression from word 610 is M and an impression from word 612 is N. In FIG. 7, M and N belong to bucket 706. Accordingly, consonant impressions comparator 904 may output ½.

When the impressions belong to different buckets, consonant impressions comparator 904 may output the value 1 (or another value indicating that the impressions are). For example, impression S and F belong to buckets 702 and 708, and consonant impressions comparator 904 may output the value 1. If one of the two input impressions is a null impression, the output is the value 1 (or another fixed value indicating that the impressions are distant).

Figure 10:
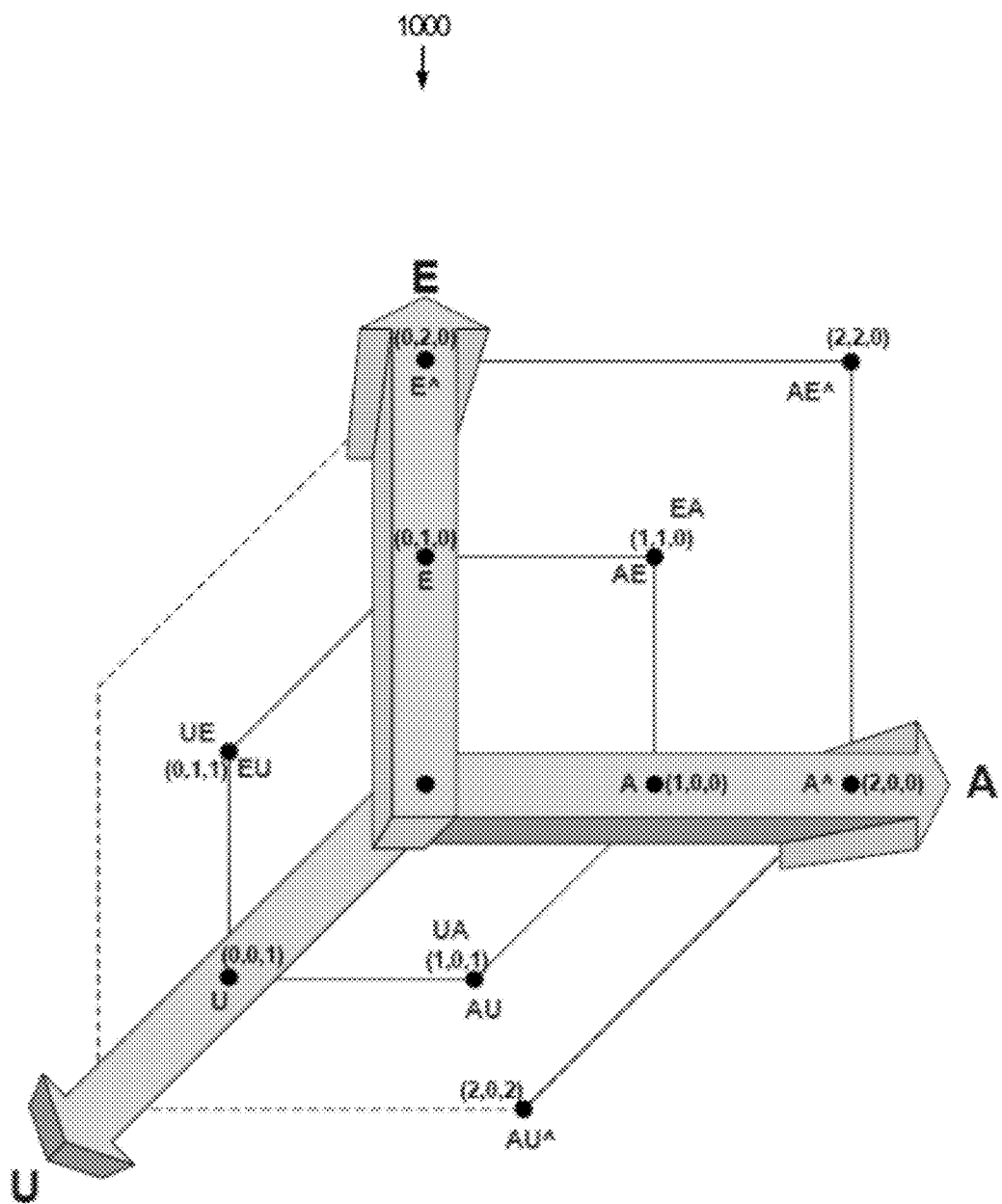
FIG. 10 illustrates an exemplary three-dimensional (3D) model of the vowel impressions of FIG. 8.

Vowel impressions comparator 906 may receive two vowel codes/impressions as input and may determine and output a distance between the input impressions. More specifically, vowel impressions comparator 906 may determine and output the Euclidean distance between vowel impressions plotted on a three-dimensional (3D) model of vowel classification system 800. FIG. 10 illustrates the exemplary 3D model 1000 of vowel classification system 800. As shown in FIG. 10, most of the vowel impressions in FIG. 8 may be depicted as a point or a vector on the 3D space whose axes are 'a,' 'e' and 'u' vowel impressions. In this implementation, the output of vowel impressions comparator 906 may include a distance between a point that corresponds to one vowel impression in 3D model 900 and another point corresponding to the other vowel impression in 3D model 900. In a different implementation, vowel impressions may be modeled or mapped to elements of a different type of space (e.g., 4-D model, 2-D model, etc.) or a set.

As shown, each of vowel impressions 'a,' 'e,' or 'u' may be represented by a point on corresponding one of coordinates (1,0,0), (0,1,0) or (0,0,1), respectively. Points representing vowel impressions "ae," "eu," "ua," "au," "ea" and "ue" may include coordinates (1,1,0), (0,1,1), (1, 0, 1), (1, 0, 1), (1, 1, 0), and (0, 1, 1), respectively. In addition, while a stressed vowel "aˆ" exists for the corresponding vowel "a," stressed vowel "uˆ" does not exist for "u" (e.g., the stressed vowel "uˆ" cannot be distinguished from "u").

In FIG. 10, the vowel impressions "ae" and "ea" have the same coordinates (1,1,0). Because, however, "ae" and "ea" are distinct from one another, "ae" and "ea" should have a distance. Toward that end, "ae" and "ea" may be viewed as vectors of different directions. That is, "ae" and "ea" may be related to one another by the analogy to the vector relation $\overline{A}x\overline{E}=-\overline{E}x\overline{A}$ (vector product). Furthermore, "aeˆ" and "eaˆ" (if it existed) may share a relationship similar to the relationship between "ae" and "ea." In this implementation, "ae" and "eaˆ" have the distance of $2^{1/2}$. In fact, "ae," "aeˆ," "eaˆ" and "ea" form the vertices of a square in the 3D space, with the width of $2^{1/2}$.

In the 3D space of FIG. 10, each of certain vowel impressions of FIG. 8 (e.g., "aeˆau" and "auˆae") cannot correspond to a single point in 3D model 1000. Such vowel impressions may be represented via an appropriate combination of points in 3D model 1000.

Depending on the implementation, the Euclidean distances between different vowel impressions in 3D model 1000 of FIG. 10 may be normalized to different distances. For example, in one implementation, distances between two different vowel impressions may be normalized such that the distance between "a" and "a" (e.g., the same vowel impression) is zero and the distance between "aeˆ" and "auˆ" is one.

Returning to FIG. 9, distance function logic 908 may sum the distances that are output by consonaant impressions comparator 904 and vowel impressions comparator 906, and normalize the sum to produce the overall distance between phonetic words input to difference function logic 604. In one implementation, distance function logic 908 may evaluate the following expression:

Overall Distance=2·Sum of Distances from comparators 904 and 906/Number of symbols in phonetic words 610 and 612 (2)

In expression (2), the sum of distances output by comparators 904 and 906 is multiplied by the factor of 2 to account for the fact that words 610 and 612 are mutually different from one another.

In FIG. 9, when words 610 and 612 arrive at switching logic 902, words 610 and 612 may be of different lengths. In addition, a consonant impression at one position in word 610 may not necessarily correspond to, at the same position in word 612, a consonant impression, but to a vowel impression (e.g., word 610 is a shifted version of word 612). In these instances, matching raw phonetic word 610 to phonetic word 612 may not result in an accurate distance.

In some implementations, to cope with such cases, difference function logic 604 may insert one or more instances of a null code in phonetic word 610 and/or 612. A null code may represent a non-existent bucket in FIG. 7 as well as the origin in a 3D model 900. In one implementation, difference function logic 604 may select the insertion points of the null code in words 610 and/or 612 to minimize the overall cost or distance between words 610 and 612. In another implementation, difference function logic 604 may select the insertion points to equalize the lengths of words 610 and 612. In yet another implementation, difference function logic 604 may select the insertion points such that a consonant impression of word 610 is always compared to either another consonant impression of word 612 or null code of word 612; and a vowel impression of word 612 is always compared to either a another vowel impression or null code of word 612.

Figure 11:
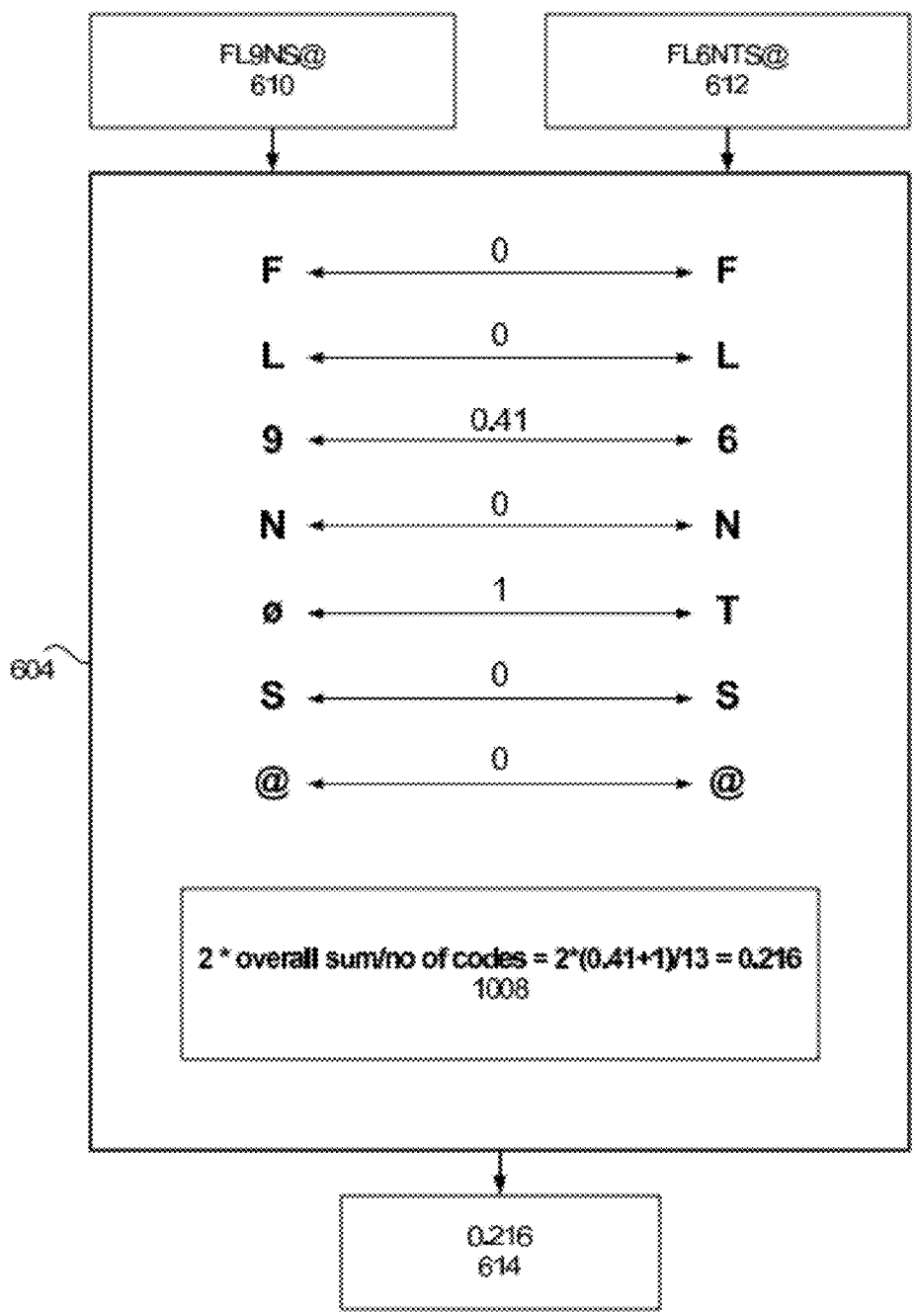
FIG. 11 is a diagram illustrating exemplary operation of the distance logic of FIG. 9.

FIG. 11 is a diagram illustrating exemplary operation of difference function logic 604. In the example, assume that phonetic word 610 is FL9NS@ and phonetic word 612 is FL6NTS@. Once phonetic words FL9NS@ and FL6NTS@ are input to difference function logic 604, difference function logic 604 may augment FL9NS@ with a null code, to obtain FL9NøS@. This may allow T in FL6NTS@ to be compared to the null code in FL9NSø@, for achieving the minimum distance (least cost method).

Subsequently, consonant impressions comparator 904 and vowel impressions comparator 906 may receive a sequence of pairs of impressions from switching logic 902. As shown, consonant/vowel impressions comparator 904/906 may compare F (of FL9NøS@) to F (of FL6NTS@) to produce 0; compare L to L to produce 0; 9 to 6 to produce 0.41; compare N to N to produce 0; compare ø to T to produce 1; compare S to S to produce 0; and compare @ to @ to produce zero.

As further shown in FIG. 11, distance function logic 908 may determine the overall distance in accordance with expression (2). Therefore, the overall distance is D=2·Sum of differences output by comparators 904 and 906/Number of impressions in words 610 and 612. Assuming that the number of impressions in words 610 and 612 are 13 (not counting the null code), D=2·(0+0+0.41+0+1+0+0)/13=2·1.41/13≈0.218, which may be output as difference 614.

FIG. 12 shows a table 1200 illustrating exemplary VID distances between different words. In particular, table 1200 shows a distance between "California" and a phonetically similar string "kaliphornia"; a distance between "cruiser" and "croosar"; and a distance between "bridge" and "brij." As further shown, "California" and "kaliphornia" yield different phonetic codes, and hence, the phonetic distance between the words is non-zero. "Cruiser" and "croosar" are distinct from each other due to different vowel impressions. "Bridge" and "brij" are phonetically indistinguishable to VID 602, and hence, the phonetic distance between them is zero.

Figure 13:
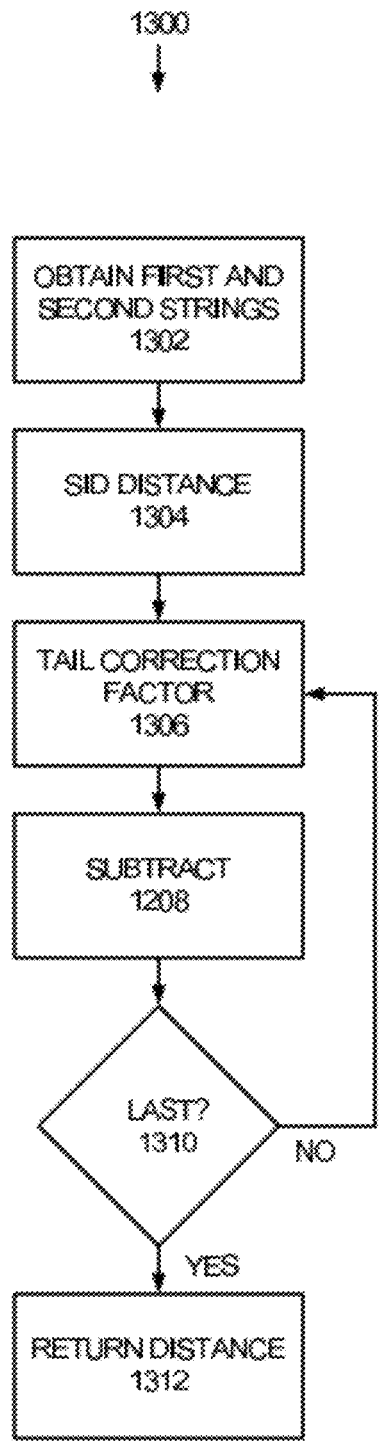
FIG. 13 is a flow diagram of an exemplary process for determining a SID and TAIL distance between two strings.

FIG. 13 is a flow diagram of an exemplary process 1300 for determining a SID and TAIL distance between two strings. As shown, process 1300 may begin with application 304 obtaining a first string and a second string (block 1302). Depending on the implementation, application 304 may obtain the strings from, for example, word processing, spell checking, instant messaging text, speech-to-text transcription, a text document, a web document, a dictionary (e.g., for suggesting a word), etc.

SID and TAIL distance logic 306 may obtain a SID distance (block 1304). For example, when application 306 invokes SID and TAIL distance logic 306, SID and TAIL distance logic 306 may determine the number of transposition, substitution, insertion, and/or deletion operations to convert the first string to the second string.

SID and TAIL distance logic 306 may obtain a TAIL correction factor (block 1306). In a loop comprising 1306-1310, at block 1306, for each of the operations to convert the first string to the second string, SID and TAIL distance logic 306 may determine a distance between the mismatching symbols based on keyboard codes (see FIGS. 4B). Furthermore, SID and TAIL distance logic 306 may perform a lookup of each of the distances in table 500 to retrieve a TAIL correction factor (see FIG. 5).

SID and TAIL distance logic 306 may subtract the TAIL correction factor from the previous result of subtracting TAIL correction factors from the SID distance determined at block 1304, in the loop that includes blocks 1306, 1308, and 1310 (block 1308).

SID and TAIL distance logic 306 may determine whether there is an additional TAIL correction factor needed to adjust for the SID distance determined at block 1304 (block 1310). If so (block 1310—YES), process 1300 may return to block 1306). Otherwise (block 1310—NO), process 1300 may proceed to block 1312.

At block 1312, SID and TAIL distance logic 306 may return the overall SID and TAIL distance between the two strings to another process or logic, such as application 304. Upon obtaining the distance of the two strings from SID and TAIL distance logic 306, application 304 may use the result, for example, to suggest a string that comes "closest" to a string typed by a user, replace a spell checked word with a correct word, etc.

Figure 14:
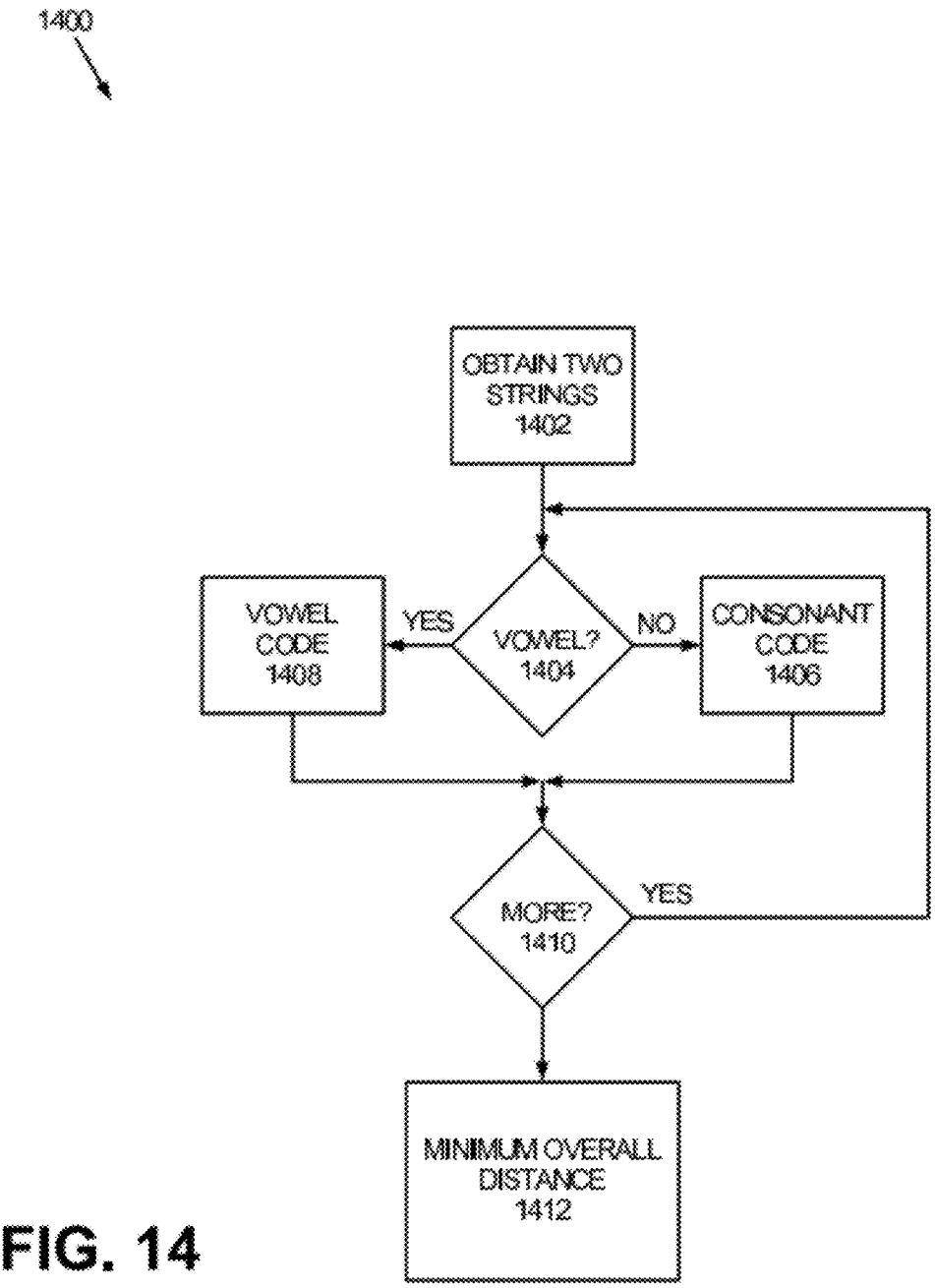
FIG. 14 is a flow diagram of an exemplary process for determining a VID distance between two strings.

FIG. 14 is a flow diagram of an exemplary process for determining a VID distance between two strings. Application 304 may obtain two strings (block 1402). Depending on the implementation, application 304 may obtain the strings from, for example, word processing, spell checking, instant messaging text, speech-to-text transcription, text document, web document, dictionary (e.g., for suggesting a word), etc.

VID distance logic 308 may determine whether a symbol for a string is a consonant or a vowel (block 1404). If the symbol is a consonant (block 1404—NO), VID distance logic 308 may obtain a consonant impression (block 1406). Otherwise (block 1404—YES), VID distance logic 308 may obtain a vowel impression (block 1408). At block 1410, VID distance logic 308 may determine whether there are additional symbols in the strings for which vowel or consonant impressions may be obtained. If there are additional symbols (block 1410—YES), VID distance logic 308 may return to block 1404, to convert additional symbols into vowel/consonant impressions. Otherwise (block 1410—NO), VID distance logic 308 may proceed to block 1412.

VID distance logic 308 may perform acts that are associated with blocks 1404 through 1410 for both of the strings obtained at block 1402. When VID distance logic 308 exits block 1410, VID distance logic 308 may output two phonetic words 610 and 612 for the two strings, respectively.

At block 1412, VID distance logic 308 may obtain the minimum overall distance between phonetic words 610 and 612. Furthermore, in obtaining the minimum overall distance, VID distance logic 308 may determine each of the distances between the consonant and vowel impressions of the first string and the corresponding consonant and vowel impressions of the second string. As explained above, in some implementations, to obtain the minimum distance, VID distance logic 308 may, in effect, insert one or more instances of the null code in words 610 and/or 612.

Once the VID distance is obtained at block 1412, application 304 may use the distance obtained from VID distance logic 308, for example, to suggest a string that is "closest" to a string typed by a user, replace a spell-checked word with a correct word, etc.

In the foregoing description, application 304 may obtain distances between strings based on keyboard SID and TAIL distances and VID distances. The application may use the distances between the strings, for example, to offer spelling suggestions, spell check a document, etc. The application may include a word processing program, speech-to-text transcription program, instant messaging program, texting program, etc.

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks have been described with regard to an exemplary process illustrated in FIGS. 13 and 14, the order of the blocks may be modified in other implementations. In addition, non-dependent blocks may represent acts that can be performed in parallel to other blocks. Furthermore, one or more of the blocks may be omitted in other implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving user input;
selecting two strings to compare based on the user input;
obtaining a first phonetic word for a first of the two strings by classifying each of consonants of the first string as a consonant impression that belongs to a bucket;
obtaining a second phonetic word for a second of the two strings by classifying each of consonants of the second string as a consonant impression that belongs to a bucket;
determining a phonetic distance between the first and second phonetic words by:
outputting a distance indicating a difference between a consonant impression of the first phonetic word and a consonant impression of the second phonetic word when the consonant impressions of the first and second phonetic words do not belong to a same bucket,
outputting a distance indicating a minor difference between the consonant impressions of the first and second phonetic words when the consonant impression of the first phonetic word and the corresponding consonant impression of the second phonetic word belong to the same bucket, wherein the consonant impressions of the first and second phonetic words are not the same, and
outputting a distance indicating sameness of the consonant impressions when the consonant impressions of the first and second phonetic words are the same; and
sending a result associated with determining the phonetic distance to another device, storing the result in a storage device, or displaying the result.

2. The method of claim 1, wherein determining a distance between the first and second phonetic words includes:
looking up vowel impressions corresponding to vowels of the first string and the second string; and
obtaining a Euclidean distance between the vowel impressions.

3. The method of claim 2, wherein looking up vowel impressions includes:
looking up codes that represent vectors corresponding to the vowel impressions.

4. The method of claim 3, wherein the vectors include the same endpoints and different directions.

5. The method of claim 1, further comprising:
suggest a spelling correction based on the phonetic distance; or
suggest the second of the two strings as a replacement string for the first of the two strings.

6. A device comprising:
a storage unit to store information and an application;
a transmitter to send information to a remote device;
a display screen to display information; and
one or more processors to execute the application to:
select two strings;
obtain a first set of phonetic codes for a first of the two strings by classifying each of consonants of the first string as a consonant impression that belongs to a bucket;
obtain a second set of phonetic codes for a second of the two strings by classifying each of consonants of the second string as a consonant impression that belongs to a bucket;
determine a phonetic distance between the two strings based the first and the second set phonetic of codes by:
outputting a distance indicating a difference between a consonant impression of the first set of phonetic codes and a consonant impression of the second set of phonetic codes when the consonant impressions of the first and second set of phonetic codes do not belong to a same bucket,
outputting a distance indicating a minor difference between the consonant impressions of the first and second set of phonetic codes when the consonant impression of the first set of phonetic codes and the corresponding consonant impression of the second set of phonetic codes belong to the same bucket, wherein the consonant impressions of the first and second set of phonetic codes are not the same, and
outputting a distance indicating sameness of the constant impressions when the consonant impressions of the first and second set of phonetic codes are the same; and
send a result associated with determining the phonetic distance to the remote device, store the result in the storage unit, or display the result on the display screen.

7. The device of claim 6, wherein when the one or more processors obtain a first set of codes, the one or more processors are configured to:
obtain vowel impressions and consonant impressions of the two strings.

8. The device of claim 7, wherein when the one or more processors determine the distance, the one or more processors are configured to:
obtain a vowel distance by calculating an Euclidean distance between one of the vowel impressions of the first string and a corresponding one of the vowel impressions of the second string; and
obtain a consonant distance based on the consonant impressions.

9. The device of claim 7, wherein when the one or more processors determine the distance, the one or more processors are further configured to:
normalize the vowel distance; and
add the normalized vowel distance to the consonant distance.

10. The device of claim 6, wherein the device includes one of:
a tablet computer; a laptop computer; a personal computer; or a gaming console.

11. The device of claim 6, wherein the one or more processors execute the application further to:
suggest a spelling correction based on the phonetic distance; or suggest the second of the two strings as a replacement string for the first of the two strings.

12. The device of claim 11, wherein the application includes:
a speech-to-text application.

13. A non-transitory computer-readable storage device, comprising computer-executable instructions, when executed by one or more processors, cause the processors to:
receive user input;
select two strings to compare based on the user input;
obtain a first phonetic word for a first of the two strings by classifying each consonant of the first string as a consonant impression that belongs to a bucket;
obtain a second phonetic word for a second of the two strings by classifying each consonant of the second string as a consonant impression that belongs to a bucket;
determine a phonetic distance between the first and second phonetic words by:
outputting a distance indicating a difference between a consonant impression of the first phonetic word and a consonant impression of the second phonetic word when the consonant impressions of the first and second phonetic words do not belong to a same bucket,
outputting a distance indicating a minor difference between the consonant impressions of the first and second phonetic words when the consonant impression of the first phonetic word and the corresponding consonant impression of the second phonetic word belong to the same bucket, wherein the consonant impressions of the first and second phonetic words are not the same, and
outputting a distance indicating sameness of the consonant impressions when the consonant impressions of the first and second phonetic words are the same; and
send a result associated with determining the phonetic distance to another device, storing the result in a storage device, or displaying the result.

14. The non-transitory computer-readable storage device of claim 13, wherein when the instructions cause the one or more processors to determine a phonetic distance between the first and second phonetic words, the instructions cause the one or more processors to:
look up vowel impressions corresponding to vowels of the first string and the second string; and
obtain a Euclidean distance between the vowel impressions.

15. The non-transitory computer-readable storage device of claim 14, wherein when the instructions cause the one or more processors to look up vowel impressions, the instructions cause the one or more processors to:
look up codes that represent vectors corresponding to the vowel impressions.

16. The non-transitory computer-readable storage device of claim 15, wherein the vectors include the same endpoints and different directions.

17. The non-transitory computer-readable storage device of claim 13, wherein when the one or more processors determine the phonetic distance, the instructions cause the one or more processors to:
obtain a vowel distance;
normalize the vowel distance; and
add the normalized vowel distance to the consonant distance.

18. The non-transitory computer-readable storage device of claim 17, wherein when the one or more processors determine obtain a vowel distance, the instructions cause the one or more processors to:
obtain vowel impressions by classifying a vowel of the first string as one of:
a primary vowel, a secondary vowel, a stressed vowel, or a combination vowel.

19. The non-transitory computer-readable storage device of claim 13, wherein the instructions comprise an application that further cause the one or more processors to:
suggest a spelling correction based on the phonetic distance; or
suggest the second of the two strings as a replacement string for the first of the two strings.

20. The non-transitory computer-readable storage device of claim 19, wherein the application includes at least one of:
a word processing application;
a web browser application;
a text messaging application; or
a speech-to-text application.

* * * * *